United States Patent
Mennell et al.

(10) Patent No.: US 12,205,045 B2
(45) Date of Patent: *Jan. 21, 2025

(54) DETERMINING THE STATUS OF AN ENTITY USING AN EXPERT SYSTEM

(71) Applicant: AORA GROUP LIMITED, London (GB)

(72) Inventors: Bruce Antony Mennell, London (GB); Alan David Millington, London (GB)

(73) Assignee: AORA GROUP LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,037

(22) Filed: Jun. 29, 2023

(65) Prior Publication Data

US 2023/0342637 A1  Oct. 26, 2023

Related U.S. Application Data

(63) Continuation of application No. 16/885,235, filed on May 27, 2020, now Pat. No. 11,741,378.

(51) Int. Cl.
| | | |
|---|---|---|
| *G06F 9/44* | (2018.01) | |
| *G06F 8/30* | (2018.01) | |
| *G06F 9/445* | (2018.01) | |
| *G06F 9/455* | (2018.01) | |
| *G06N 5/022* | (2023.01) | |
| *G06N 5/025* | (2023.01) | |
| *G06N 20/00* | (2019.01) | |

(52) U.S. Cl.
CPC ............ *G06N 5/022* (2013.01); *G06F 8/31* (2013.01); *G06N 5/025* (2013.01); *G06N 20/00* (2019.01)

(58) Field of Classification Search
CPC .................. G06N 20/00; G06F 8/31
See application file for complete search history.

(56) References Cited

U.S. PATENT DOCUMENTS

| | | | | |
|---|---|---|---|---|
| 8,103,610 B2 * | 1/2012 | Tan | .......................... | G06N 5/04 706/47 |
| 10,818,395 B1 * | 10/2020 | Khalak | .................. | G16H 10/60 |
| 11,416,956 B2 * | 8/2022 | Wodetzki | ................ | G06F 15/76 |
| 11,966,928 B2 * | 4/2024 | Lopez Garcia | ...... | G06Q 30/018 |

(Continued)

FOREIGN PATENT DOCUMENTS

CA   3047939 A1 * 12/2019  .......... G06F 11/3604

OTHER PUBLICATIONS

Krisztina Varlaki, A hybrid decision making focused on legal processes, 2018, pp. 1-6. https://ieeexplore.ieee.org/stamp/stamp.jsp?tp=&arnumber=8639868 (Year: 2018).*

(Continued)

*Primary Examiner* — Mongbao Nguyen
(74) *Attorney, Agent, or Firm* — Newport IP, LLC; Jacob P. Rohwer

(57) ABSTRACT

Expert systems and methods determine the status of an entity in relation to one or more legal provisions. The one or more legal provisions are defined by one or more rules, which are evaluated using input data from a user which comprises attribute data related to the entity. The status of the entity is determined using the one or more rules and input data and is returned to the user.

20 Claims, 8 Drawing Sheets

(56) References Cited

U.S. PATENT DOCUMENTS

| | | | |
|---|---|---|---|
| 2016/0103823 A1* | 4/2016 | Jackson, Jr. | G06N 5/025 |
| | | | 704/9 |
| 2017/0329788 A1* | 11/2017 | Grasselt | G06F 16/3344 |
| 2019/0171438 A1* | 6/2019 | Franchitti | G06N 3/08 |
| 2019/0392329 A1* | 12/2019 | Rangarajan | G06F 8/76 |
| 2021/0073654 A1* | 3/2021 | Ameri | G06F 16/9536 |
| 2021/0304042 A1* | 9/2021 | Mukherjee | H04N 21/4826 |
| 2021/0312562 A1* | 10/2021 | Brisimi | G06N 20/00 |
| 2022/0019624 A1* | 1/2022 | Gwozdz | G06F 40/30 |

OTHER PUBLICATIONS

Krisztina Varlaki, A hybrid decision making focused on legal processes, 2018, pp. 1-6. https://ieeexplore.ieee.org/stamp/stamp.jsp?arnumber=8639868 (Year: 2018).*

Luigi Bellomarini, Knowledge Graphs and Enterprise AI: The Promise of an Enabling Technology, 2019, pp. 1-12. https://ieeexplore.ieee.org/stamp/stamp.jsp?tp=&arnumber=8731350 (Year: 2019).*

Srishty Saha, Automated Knowledge Extraction from the Federal Acquisition Regulations System (FARS), 2018, pp. 1-8. https://ieeexplore.ieee.org/stamp/stamp.jsp?tp=&arnumber=8258353 (Year: 2018).*

English translation (CA 3047939 A1), 2019, pp. 1-49. (Year: 2019).*

* cited by examiner

DETERMINING THE STATUS OF AN ENTITY USING AN EXPERT SYSTEM

CROSS-REFERENCE TO RELATED APPLICATION

This application is a continuation of U.S. patent application Ser. No. 16/885,235, filed May 27, 2020, the content of which application is hereby expressly incorporated herein by reference in its entirety.

BACKGROUND

An expert system is a computer-based system that emulates the decision-making of a human expert. Expert systems comprise a knowledge base which contains facts and rules and may also require data to be input by a user such as by asking questions. Most prior expert systems reach decisions through the application of IF/THEN rules.

The following disclosure presents expert systems for determining the status of an entity in relation to one or more legal provisions. The embodiments described below are not limited to implementations which solve any or all of the disadvantages of known expert systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples, the present disclosure provides an expert system comprising a storage medium storing a knowledge base, said knowledge base containing one or more rules for determining the status of an entity in relation to one or more legal provisions, the one or more rules defining the one or more legal provisions, wherein there is one or more rules per legal provision and each rule definition comprises one or more expressions in a programming language. In some examples, each rule definition comprises one or more expressions in a compiled programming language. In some examples, each rule definition comprises one or more expressions in an interpreted programming language. An interpreted programming language is one which is not compiled. Existing expert systems do not use an interpreted language for evaluation of legal provisions. Using an interpreted programming language to deploy the expert system means the expressions of the rules are extremely flexible. The expert system also comprises a processor coupled to the storage unit, wherein the processor is configured to: generate a graphical user interface suitable for receiving input data from a user, said input data comprising attribute values related to said entity; determine the status of said entity using the one or more rules and the input data; and return to the user the status of said entity in relation to the one or more legal provisions. In some examples, there is one rule per legal provision and each rule definition comprises at least two expressions in a run-time programming language, optionally wherein the rule definition comprises at least two expressions in an interpreted programming language.

In other examples, the present disclosure provides a computer-implemented method comprising: receiving input data from a user, said input data comprising attribute values related to an entity; receiving one or more rules from a knowledge base, the one or more rules defining one or more legal provisions, wherein there is one rule per legal provision and each rule definition comprises one or more expressions in a run-time programming language; determining the status of the entity in relation to the one or more legal provisions using the one or more rules and the input data; and returning the status of said entity in relation to the one or more legal provisions.

In other examples, the present disclosure provides a computer-implemented method for retrieving information from a user, comprising: receiving an enquiry from the user, wherein the enquiry relates to a request to determine the status of an entity in relation to one or more legal provisions; fetching one or more rules from a knowledge base, the one or more rules defining one or more legal provisions, wherein there is one rule per legal provision and each rule definition comprises one or more expressions in a run-time programming language; generating a graphical user interface suitable for receiving input data from the user, wherein the input data comprises attribute values related to the entity. The graphical user interface is configured to request said attribute values related to the entity, and values are requested based on the one or more rules to be evaluated. The attribute values are be computed when the user indicates that the value is unknown and attribute values are be assumed values which is a value that the user indicates is not certain.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The expert systems presented in the following disclosure make use of programming constructs known as expressions for rule evaluation. This affords the disclosed systems significantly more flexibility than prior systems and allows rules to be expressed more concisely when compared to prior art systems. The conciseness brings efficiency gains in terms of memory, processing and energy use. The flexibility brings benefits of being able to use the rules in a wide variety of ways and, in addition, facilitates robustness.

An expert system typically comprises a plurality of IF-THEN rules. In order to execute or resolve an individual one of the IF-THEN rules a rules engine of the expert system finds values of any attributes in the IF part of the rule and computes the outcome in the THEN part of the rule. It is desired to provide an expert system capable of determining the legal status of an entity without stalling, for example due to unavailable data, and which is robust, user-friendly, and capable of providing useful outputs.

It is desirable to provide an expert system capable of dealing with uncertain information. Particularly in applications relating to determining a legal status of an entity, it is desirable to provide an expert system which can robustly cope with information being uncertain or unknown. Examples of such expert systems are provided herein.

Also disclosed herein are expert systems capable of indicating how an automated decision is reached. Previous expert systems typically operate as "black box" technology with little or no indication given to end users about how the expert system reaches a particular automated decision. It is desirable to provide an expert system capable of determining a legal status of an entity which can indicate how the status is decided.

Figure 1:
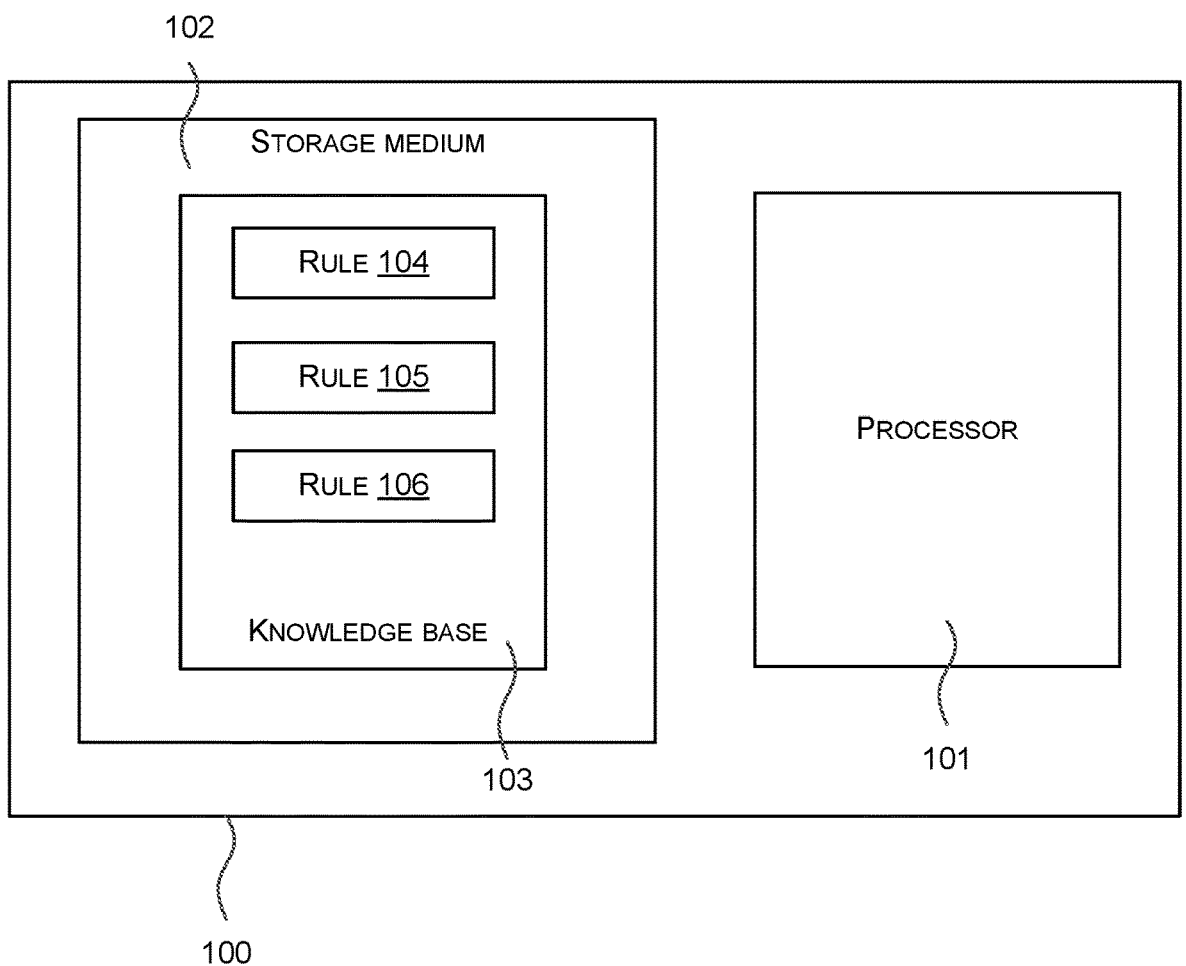
FIG. 1 is a schematic diagram of an expert system for determining the status of an entity in relation to one or more legal provisions.

FIG. 1 is a schematic diagram of an expert system 100 for determining the status of an entity in relation to one or more legal provisions, comprising processor 101 and storage medium 102. Storage medium 102 stores knowledge base 103, which contains one or more IF-THEN rules presented by rules 104, 105, and 106. Each of rules 104, 105, and 106 define one legal provision and there is one rule per legal provision. Each legal provision is therefore modelled as one rule. Thus the rule isomorphically models the legal provision. Using isomorphic modelling gives several benefits including efficiency, flexibility and robustness.

It is to be understood that, in operation, there may be more or fewer rules than the three shown in FIG. 1. The expert system 100 has a graphical user interface (GUI) formed from software stored on storage medium 602 and executed on processor 601 and to render on a display such as a computer screen, smart phone screen, or other display (not shown in FIG. 1). The expert system has a rules engine formed of software stored in storage medium 602 and executed using processor 601 which executes the rules.

In use, the expert system interacts with a human user who enters data about a human subject (referred to as an entity) in order to start an enquiry about the human subject and have the expert system make an automated decision about the status of the human subject. The expert system operates by running the rules engine to execute the rules in a specified order or sequence. The order or sequence is pre-specified or computed dynamically as explained in more detail below. The order or sequence is not computed using a decision tree and as a result there are significant benefits including efficiency and including robustness to stalling. When the rules engine operates to resolve the current rule in the sequence it checks to see if it has values of the attributes in the IF part of the IF-THEN rule. If any attribute values are missing it triggers the graphical user interface to ask the user for the missing values or it uses default values or it uses inferred values as described in more detail below. The rules engine proceeds to execute the rules according to the sequence and stores the outcomes of the computed rules. Once a suitable point in the sequence of rules has been reached, such as the end of the sequence, a status of the subject is output.

Each of rules 104, 105, and 106 is defined by one or more expressions in a run-time programming language. In an example, the run-time programming language is Python. In an example, one of the expressions evaluates to a date, wherein the date is input by the user as an attribute value. The date encodes when the rule takes effect on the entity. The date is fixed or is multi-valued and can be a complex expression. In a further example, one of the expressions is a Boolean expression which is an expression which evaluates to TRUE or FALSE. An example of a legal provision and a corresponding rule is given later in this document.

As there is one rule per legal provision, referred to as isomorphic modelling above, (as opposed to multiple rules per legal provision), there is reduced risk of contention between multiple rules. There is therefore increased confidence in the status returned by processor 101 and there is less risk of the processor crashing or malfunctioning. Furthermore, the expert system is more efficient when one rule is used per legal provision, and less input data is required to determine the status of the entity. In addition, by using one rule per legal provision it is possible to define an order of execution of the rules in a straightforward manner without using decision trees. As a result the problems mentioned above where decision trees are used to order the rules are avoided and efficiencies are gained.

Another benefit of using isomorphic modelling is that when a rule evaluates positively (to give a status of an entity) it is possible to identify a provision in the law corresponding to the rule. It is also possible to set out the facts which led to the positive evaluation in a concise and clear manner in a report which is autogenerated and explains the rationale for the determined status. In contrast, in prior art expert systems there is typically much more complexity and it is consequently difficult to autogenerate a clear and concise explanation, particularly in expert systems based on decision trees. A single rule has an unlimited number of expressions in it whereas, for example, a decision tree has one test per node. In the case of a single rule comprising five expressions it would be equivalent to a decision tree with five nodes each having one test. In such a scenario it is very difficult to generate a concise explanation from the decision tree but is straightforward to do so from the single rule.

"Legal provision" is to be understood to take its normal meaning of any stipulation, clause, statement, section, subsection, or article in a contract, legal document, statement of policy, or law. In an example, the one or more legal provisions relate to one or more stipulations, clauses, statements, sections, or articles of one or more laws. In an example, the one or more legal provisions are suitable for determining the citizenship of the entity, for example the one or more legal provisions are legal provisions defining the requirements for citizenship of the United Kingdom, the United States, or any other nation or territory. In an example, the one or more legal provisions are suitable for determining the immigration status of the entity, for example the one or more legal provisions are legal provisions defining the requirements being legally settled in the United Kingdom, the United States, or any other nation or territory. In some examples, "legally settled" is to be understood to mean that the entity has indefinite leave to remain in the nation or territory. In an example, the one or more legal provisions define the marriage laws of a nation or territory. In an example, the one or more legal provisions define tax laws of a nation or territory, including corporation tax laws, personal tax laws, or value-added tax (VAT) laws.

An "entity" is to be understood to mean any person having legal personality, including a natural person, a business entity, and a government. "Status" is to be understood to take its normal meaning of the state or classification held by the entity in relation to the one or more legal provisions. In an example, one or more statuses are determined together. For example, the entity can be determined to not be entitled to citizenship in any nation or territory but is determined to be legally married according to the same nation or territory's marriage law. A status is any state or condition determined by legal provisions, regulation or policy and a non-exhaustive list of examples of the status of an entity determined by the expert system is: citizenship, eligibility to receive benefits.

In an example, attribute values include values relating to one or more of: the date of birth of the entity, the name of the entity, the place of birth of the entity, the sex of the entity. In an example, attribute values related to the entity also include attribute values related to further entities, wherein further entities are ancestors of the entity or corporations related to the entity.

In an example, knowledge base 103 further stores reference data. Reference data includes any data that is not input by a user. Reference data is used to evaluate rules, optionally in combination with data input by the user. In an example, reference data includes one or more of: country codes, country names, date of formation of a country.

Processor 101 is coupled to storage medium 102 such that processor 101 can access knowledge base 103 and rules 104, 105, and 106. Processor 101 is configured to generate a graphical user interface (GUI) suitable for receiving input data from a user, said input data comprising attribute values related to the entity. In an example, processor 101 is configured to generate the GUI in response to receiving an enquiry from the user. In an example, the GUI includes one or more data entry forms, which include one or more data entry fields for text input and/or one or more radio buttons or option buttons, including check boxes or multiple selection lists. As used herein, the term "data entry element" is intended to refer to any of these elements or other elements that may be included in a data entry form. In an example, the GUI generates a tab for each entity that is created, wherein entities are created upon initiation of a new enquiry and when attribute values for further entities are required, wherein further entities are ancestors of the entity or corporations related to the entity. The GUI prompts the user to input data in the tabs. In this manner, the user is able to toggle between entities and attribute values for each entity are kept graphically separate.

In an example, the GUI prompts the user to input data comprising attribute values based on the one or more rules (and the expressions within each rule) to be evaluated. Processor 101 determines the attribute values needed to evaluate a rule, and the GUI requests these attribute values from the user. In an example, the GUI requests attribute values by asking questions which the user answers by selecting or entering values into data entry elements. In an example, processor 101 suppresses the number of attribute values requested by the GUI. In an example, when an attribute is tested for the first time then the graphical user interface dynamically displays on one side of the screen the attribute and on the other side of the screen questions for obtaining data relevant to the attribute from the user.

An attribute without an associated attribute value is an unassigned attribute. The GUI requests an attribute value from the user only when an unassigned attribute is needed to evaluate the rule currently being tested. For example, if rule 104 requires the date of birth of the entity in order to be evaluated, the GUI will request that the user input the date of birth of the entity only when the date of birth of the entity has no assigned value. In an example, once an attribute has an associated attribute value, no more questions are asked to the user regarding that attribute. An attribute value has associated certainty information in some cases as explained below.

Processor 101 is configured to determine the status of the entity using the one or more rules and the input data comprising attribute values. Processor 101 determines the status of the entity by evaluating each of rules 104, 105, and 106 using attribute values provided by the user and any associated certainty information. In an example, each attribute value is used to evaluate at least one rule.

The status of the entity is changed dependent upon the evaluation of each rule. Evaluation of a rule results in acquisition or loss of a status. In an example, a rule results in acquisition or loss of a status when it evaluates to TRUE. Acquisition of loss of a status is recorded in storage medium 102. In an example, a rule is associated with more than one status. In an example, the entity does not have any status in relation to the one or more legal provisions before any of the one or more rules are evaluated.

In an example, an entity can possess a status at a given date by evaluation of a derivation rule. An entity can acquire a status conferred on a date by evaluation of an acquisition rule. A status conferred on a date logically persists unless it is lost on a particular date by evaluation of a loss rule. In an example, nationality is conferred at a date of birth and persists until some legal event removes it, such as change of nationality. By contrast, immigration exemption only persists while a set of conditions are met. A status given by evaluation of a derivation rule therefore requires continued conformity to a set of conditions, whereas a status given by evaluation of an acquisition rule persists indefinitely unless it is specifically removed by a legal event. The date upon which the entity acquires or loses a status is defined in one of the expressions defining the rule. The date may be outside the lifetime of the rule, for example a status may persist for two years after acquisition. Acquisition or loss of a status may be evaluated in a period of investigation, where a period of investigation is the time period between two dates which may be indicated by the user or may be predetermined or computed by the system.

In an example, processor 101 is configured to evaluate each of the one or more rules 104, 105, and 106 in a pre-configured sequence. In an example, processor 101 is configured to evaluate each of the one or more rules 104, 105, and 106 in a sequence computed dynamically. In an example, the sequence in which the one or more rules are evaluated is computed dynamically using one or more of: rules, criteria, machine learning, algorithms.

Processor 101 is further configured to return the status of the entity in relation to the one or more legal provisions. In an example, the processor is configured to return the status of the entity after all of the one or more rules 104, 105, and 106 are evaluated. In an example, processor 101 is configured to return the status of an entity when one of the one or more rules 104, 105, and 106 is evaluated to TRUE. When processor 101 returns the status of an entity when one of the one or more rules 104, 105, and 106 is evaluated to TRUE, processor 101 ceases evaluating further rules.

In a non-limiting exemplary operation, rules 104, 105, and 106 are evaluated in a pre-configured sequence which is: rule 104, rule 105, rule 106. When processor 101 determines that rule 105 evaluates to TRUE, the processor returns the status of the entity and does not evaluate rule 106.

In an example, processor 101 returns the status of the entity to the user by displaying a message or indication in the GUI. In an example, processor 101 returns the status of the entity to the user by automatically generating a letter of representation, wherein the letter of representation is generated by: fetching a template letter in the form of a document file, automatically inserting at least one attribute value related to the entity, automatically inserting the status of the entity in relation to the one or more legal provisions, and optionally automatically inserting the legal provision that has evaluated to TRUE. In an example, processor 101 returns the status of the entity to the user by automatically populating a form with at least one attribute values related to the entity and the status of the entity in relation to the one or more legal provisions, optionally wherein the form is an application form such as a passport application form.

In an example, each of the one or more rules has an associated filter which may be null, each filter comprising a test which takes into account how many attribute values required for the rule are uncertain or unknown. In an example, the filter is a third expression defining the rule in the run-time programming language. In an example, the filter is a Boolean TRUE/FALSE expression. In an example, a rule is not evaluated if the filter for the rule indicates that it should not be evaluated. In an example, the filter indicates that the rule should not be evaluated based on knowledge of what is most probable. The filter allows processor 101 to avoid evaluating rules based on the practicality of evaluation, for example the filter takes into account how many attribute values need to be ascertained for the rule to be evaluated and how many of those attribute values are unknown or uncertain. The filter therefore acts as a heuristic approach to balancing the need for accuracy with the need to avoid long strings of questions being asked to the user. In this manner, the filter improves the efficiency of expert system 100 and reduces the risk of stalling. The filter also prevents evaluation of a rule that is very unlikely to evaluate positively by using known attribute values and computed assumed values to estimate the likelihood of positive evaluation.

In an example, the filter test also takes into account the likelihood that the rule will evaluate to true. The test computes the likelihood that the rule will evaluate to true using one or more of: historical records, machine learning, rules.

In an example, the filter is manually set or is set automatically using one of: machine learning, historical records, rules. In an example, the filter is an expression in a run-time programming language that changes over time, for example it changes as the user makes new enquiries. In this example, the filter is learnt over time by machine learning.

In an example, the legal provision defined by the one or more rules is counterfactual. A counterfactual legal provision is one that evaluates a hypothetical scenario. Such provisions have proved challenging for prior existing expert systems modelling law. It is therefore beneficial to provide a system capable of modelling counterfactual legal provisions.

In an example, one or more counterfactual legal provisions are identified by processor 101 and contain flags each for enabling a counterfactual assumption. A counterfactual legal provision includes a conditionally enabled counterfactual assumption, wherein the counterfactual assumption, if its flag is positive, is satisfied for the counterfactual legal provision to evaluate to true. Counterfactual assumption flags are passed as an argument to each function whose operation might be affected by any of the counterfactual assumptions. Each counterfactual assumption flag changes the behavior of one or more functions to behave in the counterfactual mode. In an example, each of the one or more rules that define the counterfactual legal provision are evaluated using a counterfactual assumption, wherein a counterfactual assumption is predetermined based on the hypothetical scenario defined by said counterfactual legal provision. In an illustrative example, a counterfactual legal provision requires that the entity is a person who was born legitimate (i.e. born to parents who were legally married at the time of birth). In this example, the counterfactual assumption is that the person is born legitimate. This assumption is passed as an argument to the one or more rules that may be relevant to the outcome, and the one or more expressions that define the one or more rules treat the entity as born legitimate.

In some examples, the set of flags includes an empty set, which represents the true circumstances and facts, which may or may not be known or input by the user, wherein the set of flags is the set of counterfactual assumptions used to evaluate one or more rules. For each set of flagged counterfactual assumptions that are used to evaluate one or more rules defining a legal provision, a separate event history is maintained, wherein the separate event history shows what the outcome would be if the corresponding assumptions were true.

In some examples there is a specified order for execution of the rules. Using a specified order makes it possible to minimize questions to the end user by taking the most likely situations first. Evaluation of the rules stalls if too many attributes are entered as unknown.

Alternatively, or in addition, the functionality described herein is performed, at least in part, by one or more hardware logic components. For ex ample, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In an example, the system is configured to receive a desired outcome from the user, optionally wherein the desired outcome is a desired status of an entity in relation to one or more legal provisions. Processor 101 is configured to return a list of rules that evaluate such that the desired outcome would be returned. Rules are evaluated using attribute values related to the entity. The listed rules define one or more legal provisions. In some examples, the list of rules is sent to one or more experts, wherein the one or more experts are experts in the one or more legal provisions defined by the listed rules. The one or more experts review the list to either confirm a desired outcome or overturn an undesired outcome.

In an example, the one or more legal provisions are listed in metadata that allows an external case law database to be accessed. In some examples, the user may search for relevant cases. Optionally, the user searches for relevant cases using an API (application programming interface). In some examples, the external case law database has machine learning capability. In some examples, the external case law database has machine learning capability and is configured to suggest relevant cases to the user.

In an example, a legal provision is modelled as more than one rule. A complex legal provision is a legal provision having N alternative paths to an outcome, which is the status of an entity in relation to the complex legal provision. A complex legal provision having N alternative paths to an outcome is modelled as N rules. For example, if a complex legal provision has two paths to an outcome, which is the status of an entity in relation to the complex legal provision, the complex legal provision will be modelled as two rules. In an example, the knowledge base contains one or more rules defining one or more legal provisions, wherein at least one of the one or more legal provisions is a complex legal provision modelled by more than one rule, and wherein at least one of the one or more legal provisions is a non-complex legal provision modelled by only one rule. In an example, a legal provision may be decomposed into elements and modelled by more than one rule, wherein each rule models one or more elements of the legal provision. In other examples, two or more legal provisions are modelled by one rule, wherein the legal provisions are identical in form.

In an example, the user requests evaluation of the one or more rules modelling the one or more legal provisions. In some examples, a set of heuristic rules testing a smaller set of attributes is evaluated to provide the user with an estimated probability of a positive outcome. A smaller set of attributes is a subset of the attributes normally required to reach an outcome. At least one attribute required for an outcome is not tested by the system when estimating the probability of a positive outcome. In some examples, the system uses machine learning to provide the user with an estimated probability of a positive outcome. Historic inputs and outcomes are used to provide the estimate. The term "subset" refers to some but not all elements of a set of elements. In the present document the term "subset" does not include the empty set.

Figure 2:
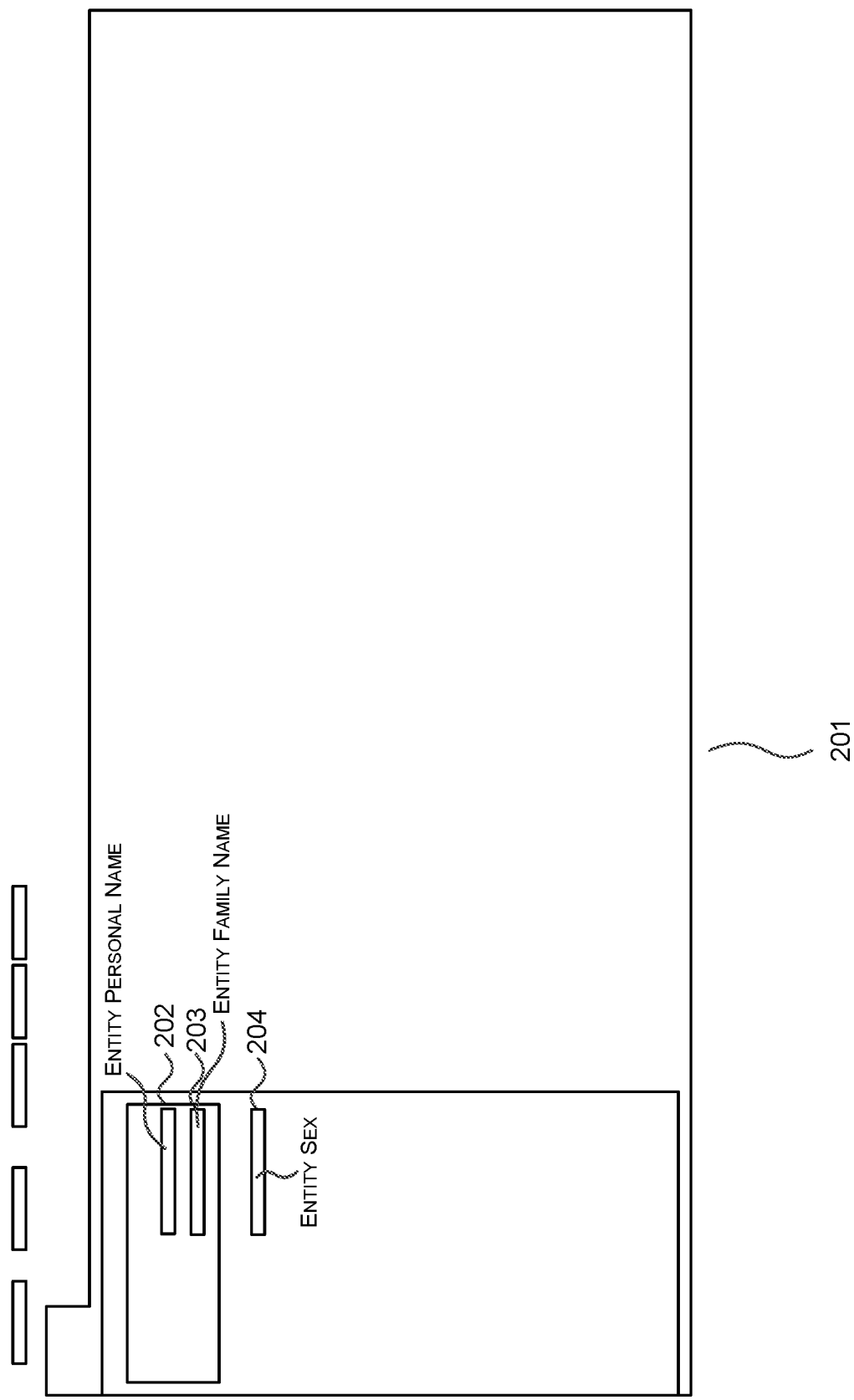
FIG. 2 is a graphical user interface (GUI) suitable for receiving user input data comprising attribute values.

FIG. 2 is an exemplary GUI 201 that may be generated by processor 101. GUI 201 includes data entry elements 202, 203, and 204. Data entry elements 202, 203, and 204 are suitable for receiving attribute values from the user.

Figure 3:
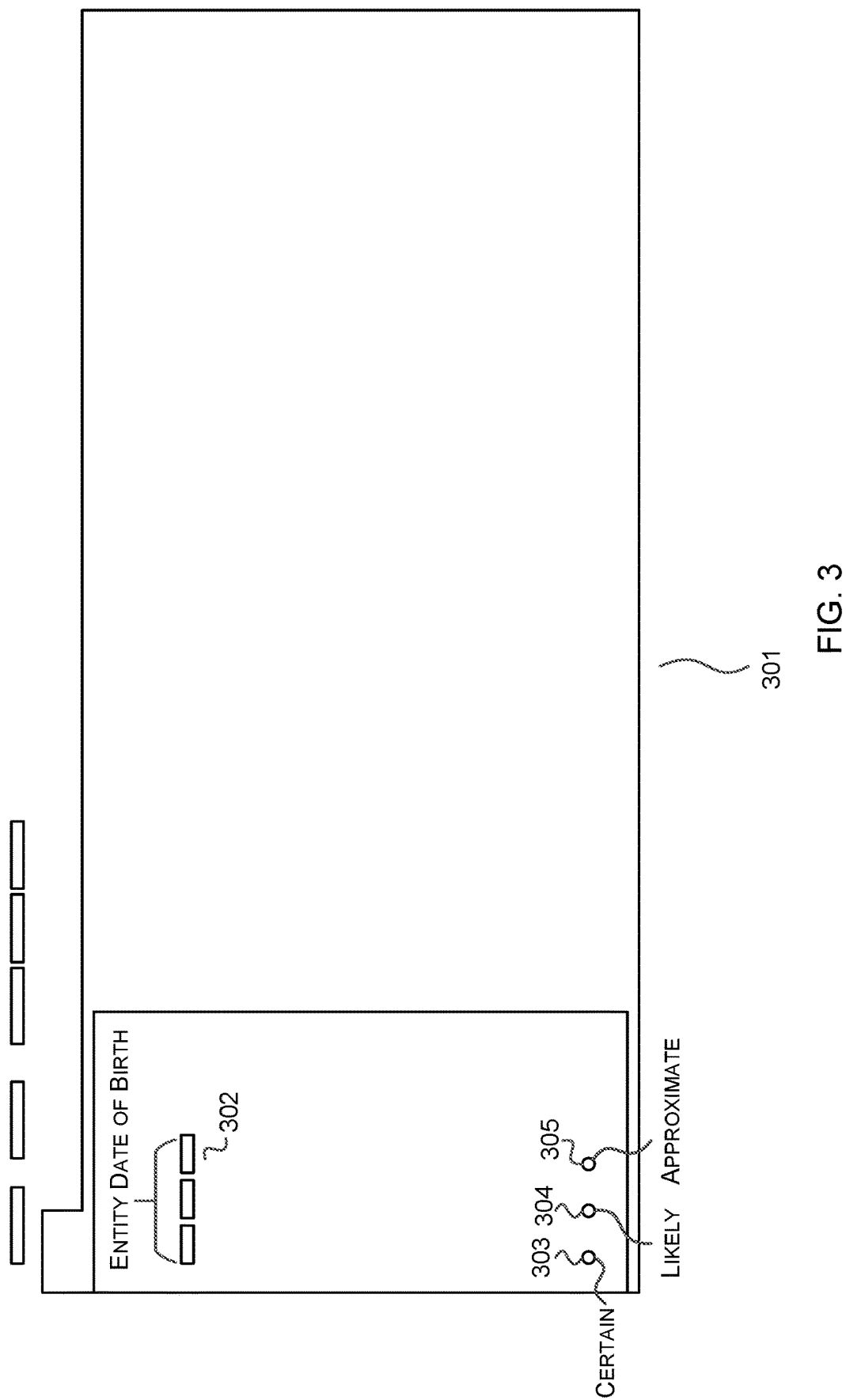
FIG. 3 is a GUI suitable for receiving user input data comprising attribute values and certainty assignments.

FIG. 3 is a further exemplary GUI 301 that may be generated by processor 101. GUI 301 includes data entry element 302 suitable for receiving an attribute value from the user. GUI 301 also includes data entry elements 303, 304, and 305. Data entry elements 303, 304, and 305 allow the user to input a certainty assignment, wherein a certainty assignment relates to the degree of certainty in an individual one of the attribute values. In this non-limiting example, the assignment value input into data entry element 302 is a date and the certainty assignments indicated by data entry elements 303, 304, or 305 relate to the degree of certainty in the date. In an example, the user only provides one certainty assignment for each attribute value. In an example, the user must provide at least one certainty assignment for each attribute value.

In an example, GUI 301 is suitable for receiving input from the user that a value is an assumed value. An assumed value is a value that is not certain. In this non-limiting example, the user provides input indicating that the value is an assumed value by selecting one of data entry elements 304 or 305. Data entry elements 304 and 305 relate to different confidence levels in the attribute value. In this non-limiting example, data entry element 304 relates to a higher level of confidence in the attribute value than data entry element 305.

Figure 4:
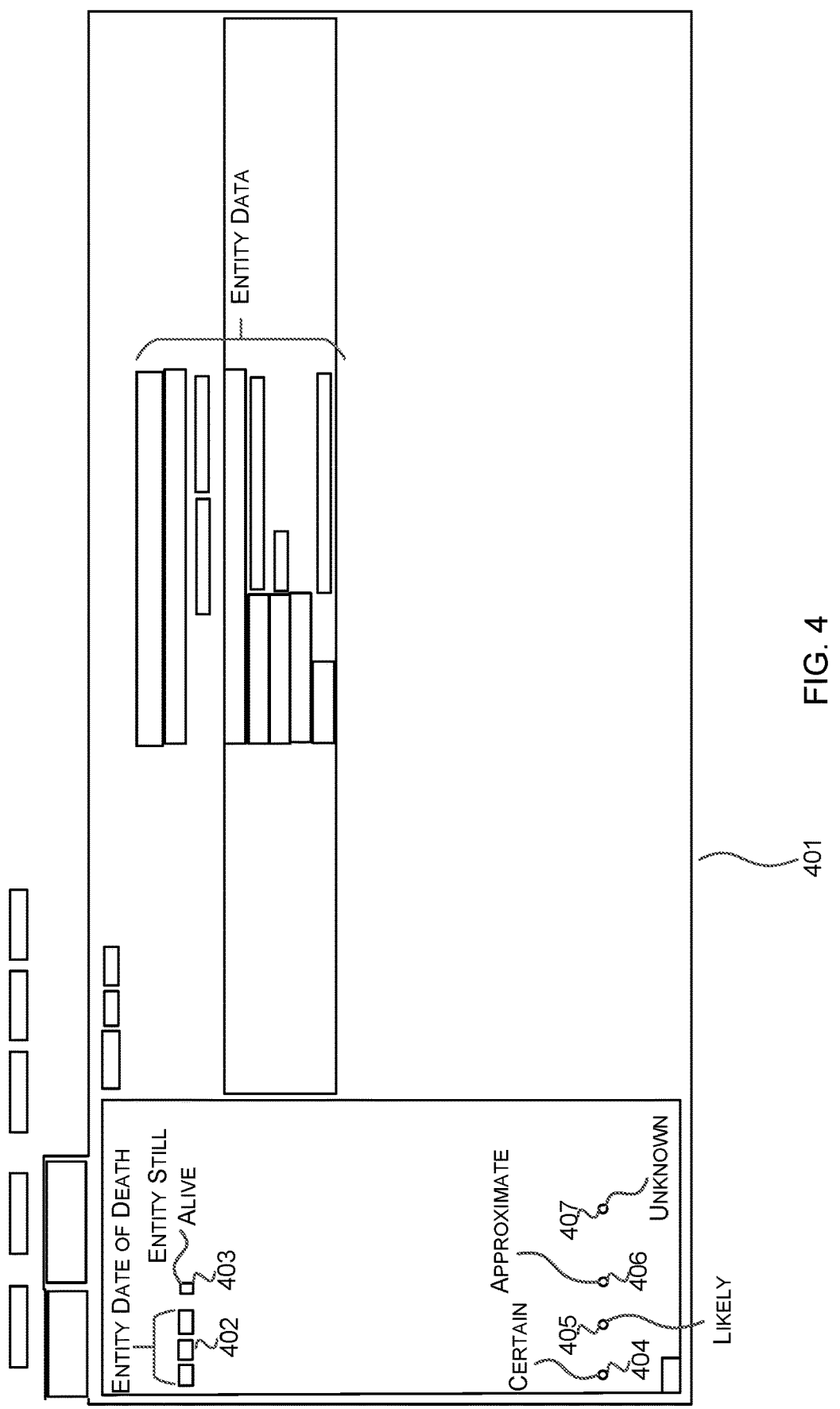
FIG. 4 is a GUI suitable for receiving user input data comprising attribute values and certainty assignments, wherein the certainty assignment can be unknown.

FIG. 4 is a further exemplary GUI 401 that may be generated by processor 101. GUI 401 includes data entry elements 402 and 403 suitable for receiving attribute values from the user and data entry elements 404, 405, 406, and 407 suitable for receiving certainty assignments from the user. In an example, the user does not input attribute values into data entry elements 402 and 403 and designates the attribute as unknown. In this non-limiting example, the user designates the attribute as unknown by selecting data entry element 407.

In an example, expert system 100 is configured to compute a value for an attribute when the user designates an attribute as unknown. In an example, attribute values that are computed by the expert system is also designated as assumed values. In an example, the expert system is configured to compute a value for an attribute when the user designates an attribute as unknown using one or more of: historical records, machine learning, rules. In an example, the unknown assumed value is computed using inference from other data. In an example, the unknown assumed value is a fixed value that is manually set.

In this non-limiting example, the attribute value will be designated as an assumed value when the user selects any one of data entry elements 405, 406, or 407. The user selects data entry element 404 when the user enters an attribute value into data entry element 402 or 403 and is certain that the attribute value is correct. The user selects one of data entry elements 405 or 406 when the user enters an attribute value into data entry element 402 or 403 and is not certain that the attribute value is correct. The user selects data entry element 407 when the user does not enter an attribute value into data entry element 402 or 403 and does not know what the attribute value is. Expert system 100 computes a value for the attribute when data entry element 407 is selected.

In an example, processor 101 returns a record of assumed values used to determine the status of the entity in relation to the one or more legal provisions. In an example, this record is returned to the user alongside the status. In an example, processor 101 returns a record of only assumed values that have been computed by expert system 100. In an example, processor 101 returns a record of all attribute values used to determine the status of the entity in relation to the one or more legal provisions. In an example, processor 101 also returns a record of all certainty assignments input by the user.

Recording certainty assignments allows the processor 101 to return a confidence value in the status of the entity in relation to the one or more legal provisions. For example, when there is one rule per legal provision, the processor 101 returns the confidence in the attribute values used to evaluate a rule that evaluated to TRUE. The user is therefore able to receive a measure of the confidence in the status returned by the processor 101, allowing the user to interpret the returned status more accurately.

Figure 5:
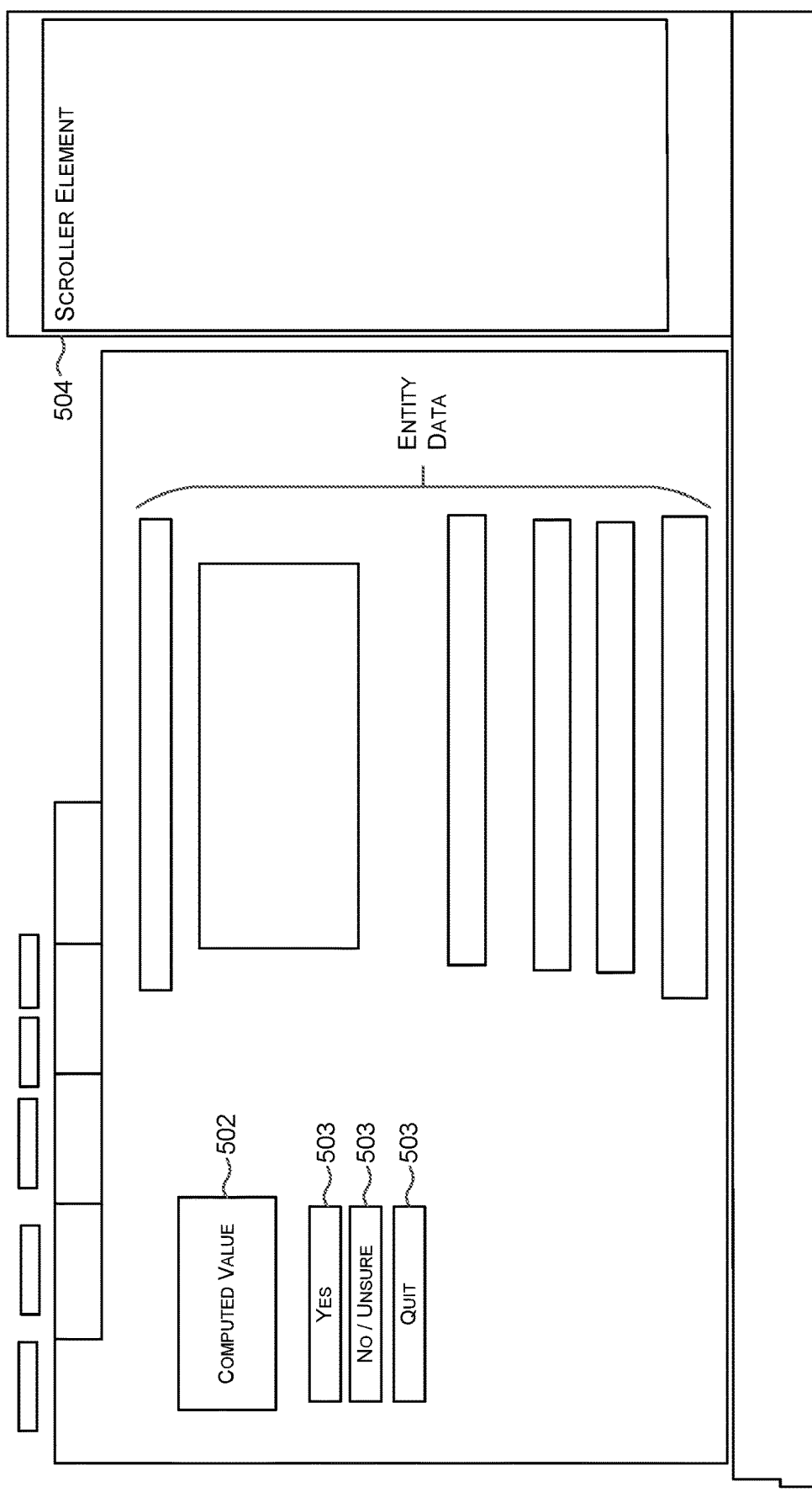
FIG. 5 is a GUI suitable for prompting the user to review computed attribute values, and also suitable for providing an indication of the rules that are being evaluated.

FIG. 5 is a further exemplary GUI 501 that may be generated by processor 101. GUI 501 includes review element 503. Review element 503 is a data entry element that allows the user to review computed value 502, for example the user can confirm that computed value 502 is correct. In an example, computed value 502 is an assumed value computed by expert system 100 in response to the user indicating that the attribute value is unknown. Alternatively, or in addition, the computed value 502 is computed by expert system 100 in response to a prompt from the user. The prompt from the user indicates that the user does not wish to enter all attribute values needed to determine the status of the entity, for example if the user wishes to reduce the amount of time spent inputting attribute values. Alternatively, or in addition, expert system 100 automatically computes values in order to reduce the burden on the user. In an example, expert system 100 automatically computes values in order to reduce the number of attribute values input by the user. Expert system 100 determines when to request that the user input an attribute value based on the level of confidence in associated attribute values. For example, expert system 100 computes an attribute value rather than request that the user input the value when it is determined that the value can be inferred from previously provided attribute values with an acceptable level of confidence. In an example, an acceptable level of confidence is a predetermined threshold. Computed values are therefore be any attribute values which are not provided by the user.

In an example, computed values are probable or non-probable. In an example, expert system 100 determines whether to compute a probable or non-probable value dependent upon whether further attribute values will need to be input by the user. In an example, a non-probable value is computed to suppress the number of further attribute values that must be input by the user. In an example, computing a non-probable value suppresses the number of questions asked to the user. In an example, the computed values are probable or arbitrary values.

By using the above features, the user can fast forward through a series of questions or attribute value requests. This allows the user to save time without sacrificing the reliability of the determination of the status of the entity.

GUI 501 also includes scroller element 504 which indicates the rules being evaluated. As each rule is evaluated, scroller element 504 is updated. Optionally, scroller element 504 is updated in real time. As shown in FIG. 5, in an example scroller element 504 also provides an indication of whether each rule has evaluated to TRUE or FALSE. In an example, scroller element 504 also indicates the legal provision that each rule is associated with. Scroller element 504 can therefore also be used to provide a reason for the status of the entity in relation to one or more legal provisions by indicating the legal provision(s) that is satisfied by the input data or the legal provision(s) that is not satisfied by the input data. In an example, the user reviews scroller element 504 when the user wishes to understand why processor 101 has returned a particular status. Additionally, in an example data in scroller element 504 is used to automatically populate a letter of representation, a report, or a form with the reason why the entity has a particular status. In an example, processor 101 populates the letter of representation or form with the one or more legal provision that is satisfied by the input data using data obtainable from scroller element 504. A letter of representation, report, or form optionally also includes instructions to the user or a legal practitioner or legal expert. The instructions optionally include a list of documents needed, for example an entity's passport, an entity's birth certificate, or an entity's certificate of incorporation. In some examples, processor 101 is also configured to populate an online application form via an API (application programming interface) using input data and the reason why the entity has a particular status. In some examples, each status can be configured such that the letter of representation, report, or form is reviewed by a system user identified in the system as an expert. In some examples, the letter of representation, report, or form is reviewed by one or more experts before it is released to the user.

In other examples, the expert system generates one or more statements. Optionally, one positive outcome and one negative outcome statement is generated for each of the rules evaluated, and each of the one or more statements includes an indication of whether the rule was evaluated to true to false. The one or more statements are generated at run time in grammatically correct prose such as a lawyer would write. The one or more statements include reasons why the legal provision evaluated positively or negatively and cite applicable legal provisions, cases, or other documents. In some examples, the user can access cited legal provisions, cases, or other documents by following a hyperlink embedded in the statement text. In some examples, the one or more statements are displayed in scroller element 504. In some examples, the one or more statements are included in a report, wherein the report further comprises input data supplied by the user. The statements and data form the reason or argument for the outcome, wherein the outcome is the returned status of the entity. In some examples, the one or more statements are included in a letter of representation or form that is automatically populated by processor 101. In some examples, the processor 101 is also configured to populate an online application form via an API (application programming interface) using input data and the reason why the entity has a particular status, wherein the reason is given in the form of one or more statements.

In an example, the GUI generates text that is displayed to the user. Text can be generated to request input data from the user, to display information to the user, to return reasons for a status to the user, and/or to return a status to the user. Text can also be generated by processor 101 when a letter of representation, form, online form, or report is generated. The text is grammatically correct. The generated text includes literal text and placeholders for variable elements, wherein variable elements are elements of text which vary depending on, for example, any of input data, status of the entity, date of enquiry, and data related to the user. Literal text is any text string that is printed literally by the GUI or processor 101 in any operation, wherein there are no variable elements within the literal text string. Where a word may vary in form, paradigms are defined. Such words that vary in form include nouns which have different singular and plural forms, nouns which vary depending on grammatical case, adjectives which may vary for grammatical case and gender, and verbs which may vary for grammatical person, number, and grammatical tense. It is to be understood that non-English languages will include words that vary differently to English words, for example French language adjectives vary dependent on the grammatical gender of the noun to which they are attached, whereas the English language does not have grammatical genders for inanimate nouns and so the adjectives attached to such nouns do not change. In some examples, when a word is a variable element in text, the word is represented by an object which associates attribute data values with the appropriate paradigm. A call to the object with appropriate arguments therefore returns the required form. In some examples, words additionally have attributes which define how they are used in conjunction with other words, for example where nouns have gender. In some examples, phrase objects are used to combine several words into units which can be changed in the same way as single words, for example where several words are linked to the same attribute value. Functions are used to combine words and phrase objections.

Figure 6:
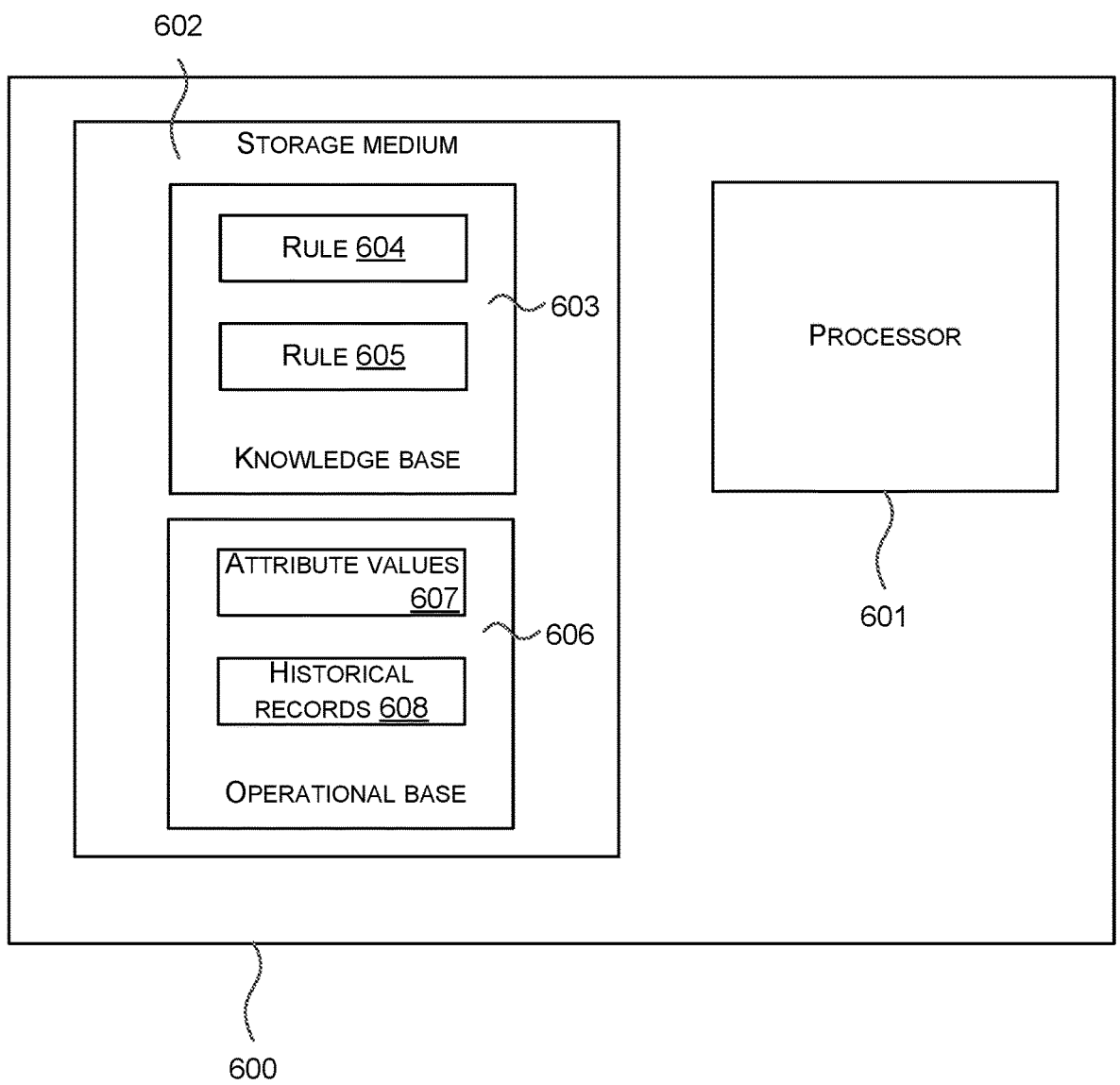
FIG. 6 is a schematic diagram of an expert system for determining the status of an entity in relation to one or more legal provisions, the expert system comprising an operational base.

FIG. 6 is a schematic diagram of an expert system 600 for determining the status of an entity in relation to one or more legal provisions, comprising processor 601 and storage medium 602. Storage medium 602 stores knowledge base 603, which contains one or more rules presented by rules 604 and 605. It is to be understood that, in operation, there may be more or fewer rules than the two shown in FIG. 6. Each of rules 604 and 605 define one legal provision and there is one rule per legal provision. Storage medium 602 also stores operational base 606. Operational base 606 contains attribute values 607 that have been input by the user, historical records 608, and optionally further contains certainty assignments input by the user and/or data relating to enquiries received from the user. Operational base 606 contains any data that changes over time, and knowledge base 602 contains data that does not change over time.

Attribute values 607 will be different for each enquiry that is received from the user, for example if the entity is different for each enquiry. Historical records 608 includes any attribute values input by the user in previous enquiries. In an example, historical records 608 include attribute values related to entities that are not the entity that is the subject of the present enquiry. In an example, historical records 608 include attribute values related only to the entity that is the subject of the present enquiry, for example when the user has run a previous enquiry on the same entity in relation to different legal provisions.

In an example, operational base 606 includes data relating to previous and current enquiries received from the user. Data relating to enquiries include one or more of: date of enquiry, enquiry key, enquiry reference number, the entity that is the subject of the enquiry, status that was determined by the enquiry, legal system used in the enquiry. In an example, a separate enquiry is created for each status that is to be determined or has been determined.

In an example, knowledge base 603 also includes a territory data model, wherein the territory data model includes data related to territories, wherein said data related to any of the territories includes the geographic, legal or political attributes of the territories. The territory data model also includes a model of relationships between territories, wherein the relationships indicate at least one of: reciprocity of legal provisions, recognition of legal status, lack of recognition of legal status.

"Territory relationships" means one or more of geographic, legal and political relationships. Examples include but are not limited to: England is part of the UK, Gibraltar is a possession of the UK, Australia has the status "Commonwealth country" in UK law, Brunei was formerly a protected state of the UK, Tanganyika was successively a protectorate, a League of Nations mandated territory and a United Nations trust territory of the UK.

Attributes of individual territories include but are not limited to: Is a Country, Is a Sovereign State, Is an Independent State, Has a Government (at the level of the territory), Has a Diplomatic Service, Has a distinct system of Family Law.

Expert system 600 is a further example of expert system 100. In an example, processor 601 and knowledge base 603 are the same as processor 101 and knowledge base 103 defined above. Likewise, GUI 201, 301, 401, and 501 may be generated by processor 601.

Figure 7:
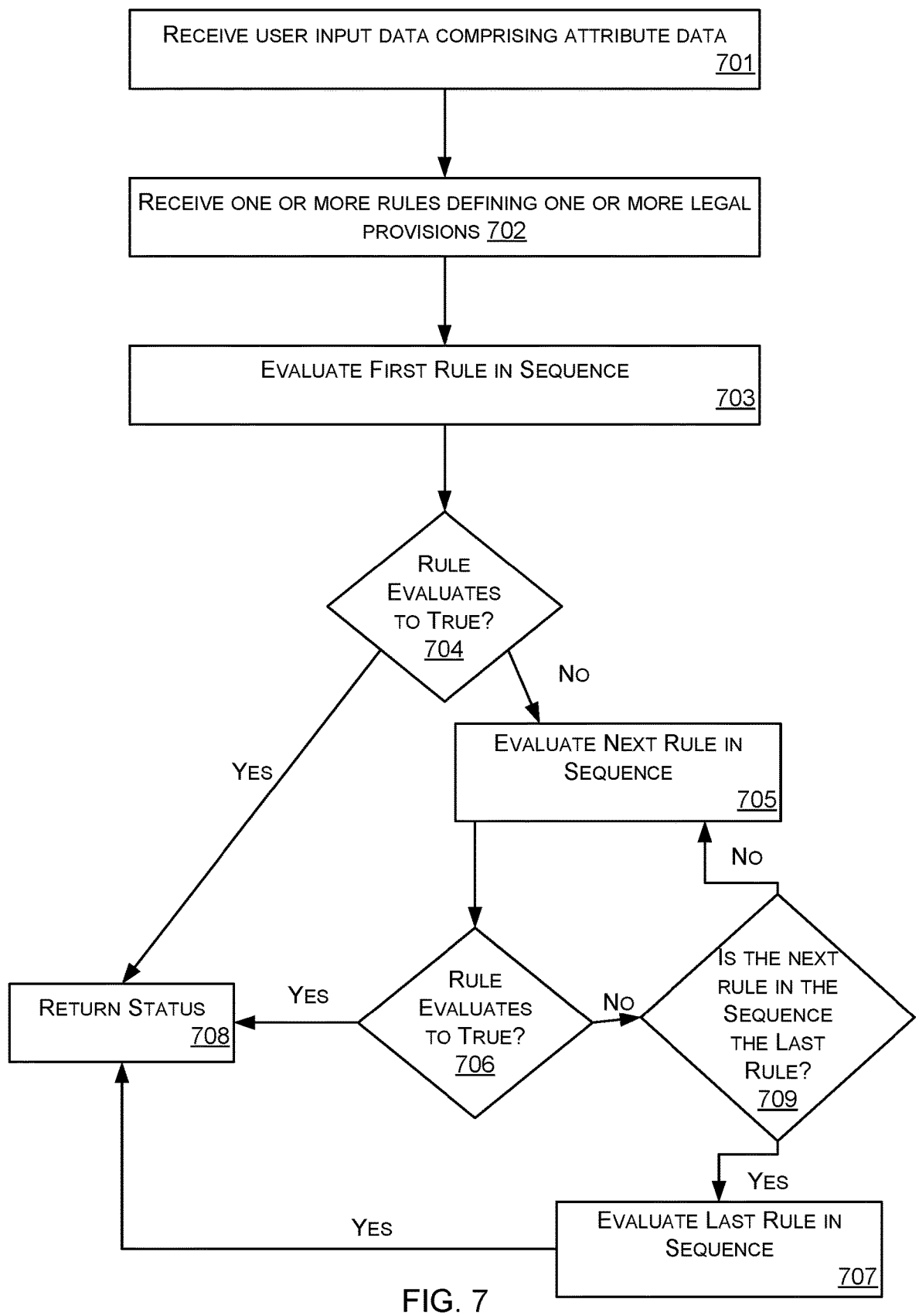
FIG. 7 is a flow diagram of a method for determining the status of an entity in relation to one or more legal provisions.

FIG. 7 is a flow diagram of a method for determining the status of an entity in relation to one or more legal provisions. At block 701, user input data is received. The input data comprises attribute values related to an entity and the attribute values have associated certainty data as mentioned above. At block 702, one or more rules are received from a knowledge base. The one or more rules define one or more legal provisions. There is one rule per legal provision and each rule definition comprises one or more expressions in a run-time programming language. At block 703, the status of the entity in relation to the one or more legal provisions is determined using the one or more rules and the input data. The expert system executes the rules in a specified sequence until it reaches a rule which evaluates successfully with absolute certainty. Thus if the expert system evaluates a rule successfully but with uncertainty then it continues to execute the next rule in the sequence until all the rules are processed or until it evaluates a rule with certainty. A similar order of processing occurs for the individual expressions and filter tests within a single rule. Filter tests are evaluated before other tests and are a type of expression. Thus when a rule is evaluated the individual expressions and filter tests within the rule are evaluated in a specified sequence.

In the example of FIG. 7, the first rule in the sequence is evaluated at block 703 and at block 704 it is decided whether the rule evaluates to true. As previously, the sequence is a pre-configured sequence or a sequence computed dynamically using one or more of: rules, criteria, machine learning, algorithms. If the rule evaluates to true, the status is returned in block 708. If the rule does not evaluate to true, the next rule in the sequence is evaluated in block 705. At block 706, it is determined whether the next rule in the sequence has evaluated to true. If the next rule has evaluated to true, the status is returned in block 708. If the next rule in the sequence is the last rule, as determined by block 709, the status is returned regardless of whether the rule evaluates to true or false. It is to be understood that FIG. 7 represents a mere example of the disclosed method. In other methods of the disclosure, all rules may be evaluated before a status is returned, notwithstanding that a rule has already been evaluated to true, or a status may be returned if a rule evaluates to false, notwithstanding that there are other rules not yet evaluated.

The method of FIG. 7 may be performed by the expert system of FIG. 1 or FIG. 6. It is to be understood that the optional features of FIGS. 1 and 6 are therefore fully intended to be combinable with the disclosed method for determining the status of an entity in relation to one or more legal provisions. The method of FIG. 7 is optionally computer-implemented.

Figure 8:
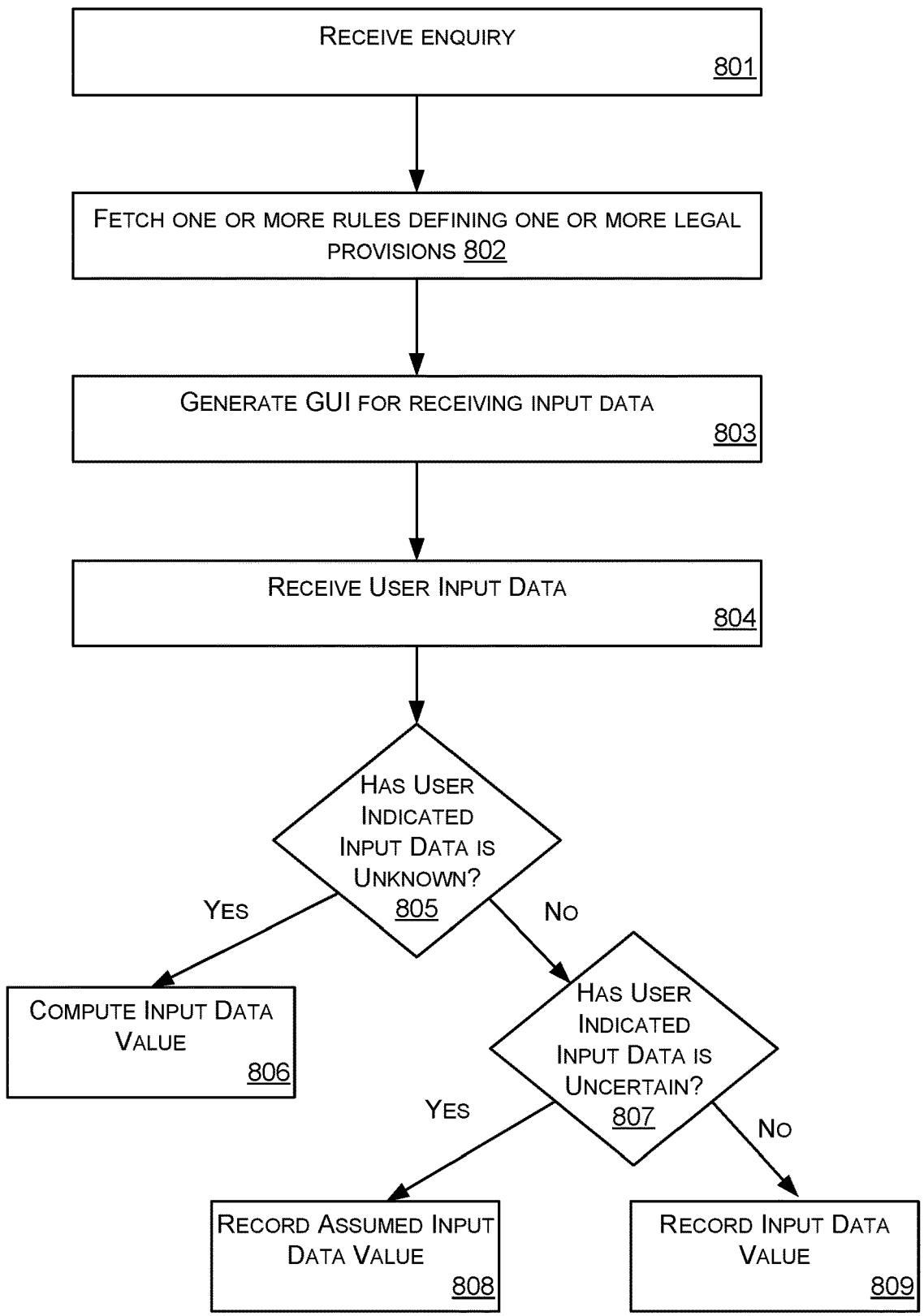
FIG. 8 is a flow diagram of a method for retrieving information from a user.

FIG. 8 is a flow diagram of a method for retrieving information from a user. At block 801, an enquiry is received from a user. The enquiry relates to a request to determine the status of an entity in relation to one or more legal provisions. At block 802, one or more rules are fetched from a knowledge base. The one or more rules define one or more legal provisions. There is one rule per legal provision and each rule definition comprises one or more expressions in a run-time programming language. At block 803, a graphical user interface (GUI) is generated. The GUI is suitable for receiving input data from the user. The input data comprises attribute values related to the entity. The GUI is configured to request said attribute values related to the entity, and values are requested based on the one or more rules to be evaluated. At block 804, the GUI receives user input comprising attribute values. Attribute values may be computed when the user indicates that the value is unknown and attribute values may be assumed values, which is a value that the user indicates is not certain. At block 805, it is determined whether the user has indicated that the input data is unknown. If this is true, the input data value is computed at block 806. If the user has not indicated that the input data is unknown, it is determined whether the user has indicated that the input data is uncertain at block 807. If this is true, the assumed input data value is recorded at block 808. If this is false, the input data value is recorded at block 809. The method of FIG. 8 may be performed by the expert system of FIG. 1 or FIG. 6. It is to be understood that the optional features of FIGS. 1 and 6 are therefore fully intended to be combinable with the disclosed method for retrieving information from a user. The method of FIG. 8 is optionally computer-implemented.

As disclosed above, expert system 100 optionally comprises one or more processors 101 which are microprocessors, controllers or any other suitable type of processors for processing computer executable instructions to control the operation of the device in order to determine the status of an entity in relation to one or more legal provisions. In some examples, for example where a system on a chip architecture is used, the processors 101 include one or more fixed function blocks (also referred to as accelerators) which implement a part of the method of determining the status of an entity in relation to one or more legal provisions in hardware (rather than software or firmware). Platform software comprising an operating system or any other suitable platform software is provided at the expert system to enable application software to be executed on the device.

The computer executable instructions are provided using any storage medium 102 that is accessible by expert system 100. Storage media includes, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the storage medium 102 is shown within the expert system 100 it will be appreciated that the storage is, in some examples, distributed or located remotely and accessed via a network or other communication link (e.g. using a communication interface).

The expert system 100 optionally also comprises an input/output controller arranged to output display information to a display device which may be separate from or integral to the computing-based device. The display information may provide the graphical user interface generated by the processor 101. The input/output controller may also be arranged to receive and process input from one or more devices, such as a user input device (e.g. a mouse, keyboard, camera, microphone or other sensor). In some examples the user input device detects voice input, user gestures or other user actions and provides a natural user interface (NUI). This user input may be used to input data including attribute values. In an embodiment the display device also acts as the user input device if it is a touch sensitive display device. The input/output controller outputs data to devices other than the display device in some examples, e.g. a locally connected printing device.

Any of the input/output controller, display device and the user input device may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

An expert system comprising: a storage medium storing a knowledge base, said knowledge base containing one or more rules for determining the status of an entity in relation to one or more legal provisions, the one or more rules defining the one or more legal provisions, wherein there is one rule per legal provision and each rule definition comprises one or more expressions in a programming language; and a processor coupled to the storage unit, wherein the processor is configured to: generate a graphical user interface suitable for receiving input data from a user, said input data comprising attribute values related to said entity; determine the status of said entity using the one or more rules and the input data; and return to the user the status of said entity in relation to the one or more legal provisions. By having one rule per legal provision efficiency of execution is obtained and improved robustness against stalling where attribute values are unavailable.

The input data may further comprise one or more certainty assignments, wherein a certainty assignment relates to the degree of certainty in an individual one of the attribute values. Using certainty assignments improves flexibility of the expert system since it is able to compute automated decisions in realistic scenarios where incomplete or uncertain information is known.

The expert system may also be configured to compute a value for an attribute when the user designates an attribute as unknown. In this way the expert system has improved robustness since it is able to give useful outputs even where key information is unavailable and otherwise a stall situation is reached.

The expert system may be configured to compute a value for an attribute when the user designates an attribute as unknown using one or more of: historical records, machine learning, rules. In this way accuracy is retained whist being able to cope with unknown information.

The graphical user interface may also be suitable for receiving input from the user indicating that a value is an assumed value, which is a value that is not certain. In this way the expert system is robust and flexible since it is able to cope where users have data which is assumed rather than known with certainty as is often the case in real life.

The processor may be configured to evaluate each of the one or more rules in a pre-configured sequence or a sequence computed dynamically using one or more of: rules, criteria, machine learning, algorithms. Using a pre-configured sequence is efficient and robust since no decision tree is involved. Using a dynamically computed sequence is even more efficient since it avoids the need to resolve rules which are redundant in particular situations.

The processor may be configured to return the status of the entity when a rule is evaluated to be true, wherein the processor is configured to cease evaluating further rules when a rule is determined to be true.

Each of the one or more rules may have an associated filter which may be null, each filter comprising a test which takes into account how many attribute values required for the rule are uncertain or unknown. A rule may not be evaluated if the filter for the rule indicates that it should not be evaluated. The test may also take into account the likelihood that the rule will evaluate to true. The test may compute the likelihood that the rule will evaluate to true using one or more of: historical records, machine learning, rules. Using filters has been found in practice to give an extremely workable expert system since the number of questions is balanced carefully against the need for accuracy.

The expert system may be further configured to operate in a mode which assigns values of selected attributes without asking the user, wherein the values may be probable or arbitrary values, and wherein the graphical user interface, at the end of an evaluation, prompts the user to optionally review the computed values. Values of attributes which are unavailable from the user may be computed using one or more of: historical records, machine learning, rules.

The graphical user interface may include an indication of the rules that are being evaluated, wherein the graphical user interface displays the rule identity, the legal provision modelled by the rule, the outcome of the evaluation, and/or any related statement. In this way the user is able to see in real-time how the expert system is progressing and have an idea of the automated decision process. This is beneficial for checking the results of the expert system and also for helping end users to understand and appreciate the benefits of the expert system.

The processor may also return a reason for the status of the entity, wherein the reason comprises the legal provision that is satisfied by the attribute values supplied by the user.

The storage medium may further comprise an operational base which comprises data that changes over time, wherein the data that changes over time includes attribute values related to the entity and historical records. The knowledge base may comprise data which does not change over time, wherein the data which does not change over time includes the one or more rules.

The graphical user interface may be configured to request input data from the user based on the attribute values which are needed for the current expression being evaluated.

The reason returned by the processor may include one or more statements, wherein the one or more statements include reasons why the legal provision is evaluated positively or negatively and cite applicable legal provisions, cases, or other documents.

The knowledge base may also include a territory data model. The territory data model includes data related to one or more territories, and said data related to one or more territories includes the geographic, legal and political attributes of the one or more territories. The territory data model may further include a model of relationships between territories, wherein the relationships indicate at least one of: reciprocity of legal provisions, recognition of legal status, lack of recognition of legal status.

At least one of the one or more legal provisions may be a counterfactual legal provision including one or more counterfactual assumptions, wherein the one or more counterfactual assumptions are used to evaluate one or more rules where the evaluation may be affected by any of the counterfactual assumptions.

Each rule definition may comprise one or more expressions in an interpreted programming language.

In an example the processor is configured to autogenerate a report with one or more legal provision satisfied by the input data.

In a further example, a computer-implemented method is provided. The method comprises: receiving input data from a user, said input data comprising attribute values related to an entity; receiving one or more rules from a knowledge base, the one or more rules defining one or more legal provisions, wherein there is one rule per legal provision and each rule definition comprises one or more expressions in a programming language; determining the status of the entity in relation to the one or more legal provisions using the one or more rules and the input data; and returning the status of said entity in relation to the one or more legal provisions.

In a further example, a computer-implemented method for retrieving information from a user is provided. The method comprises: receiving an enquiry from the user, wherein the enquiry relates to a request to determine the status of an entity in relation to one or more legal provisions; fetching one or more rules from a knowledge base, the one or more rules defining one or more legal provisions, wherein there is one rule per legal provision and each rule definition comprises one or more expressions in a programming language; generating a graphical user interface suitable for receiving input data from the user, wherein the input data comprises attribute values related to the entity; wherein the graphical user interface is configured to request said attribute values related to the entity, and wherein values are requested based on the one or more rules to be evaluated; wherein attribute values may be computed when the user indicates that the value is unknown; and wherein attribute values may be assumed values which is a value that the user indicates is not certain.

In a further example, non-transitory, computer-readable medium is provided. The computer-readable medium has computer-executable instructions that, when executed by a computer system, direct the computing system to perform operations comprising: receiving input data from a user, said input data comprising attribute values related to an entity; receiving one or more rules from a knowledge base, the one or more rules defining one or more legal provisions, wherein there is one rule per legal provision and each rule definition comprises one or more expressions in a programming language; determining the status of the entity in relation to the one or more legal provisions using the one or more rules and the input data; and returning the status of said entity in relation to the one or more legal provisions.

The examples illustrated and described herein as well as examples not specifically described herein but within the scope of aspects of the disclosure constitute exemplary means for determining the status of an entity in relation to one or more legal provisions. For example, the elements illustrated in FIG. 1, such as when encoded to perform the operations illustrated in FIG. 7, constitute exemplary means for determining the status of an entity in relation to one or more legal provisions.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or expert system may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. An expert system comprising:
a memory storing a knowledge base containing a plurality of rules defining a plurality of legal provisions and useable to determine a legal status of an entity in relation to the plurality of legal provisions, wherein each rule defines one legal provision via one or more expressions in a programming language; and
a processor coupled to the memory, wherein the processor is configured to:
generate a graphical user interface that presents a group of attributes related to the entity and that is suitable for receiving user input data comprising: values for the group of attributes;
certainty assignments, wherein a certainty assignment relates to a degree of certainty in an individual one of the values for the group of attributes; and
a designation that a value for an attribute in the group of attributes is unknown;
execute the plurality of rules defining the plurality of legal provisions in a specified sequence based on the user input data received via the graphical user interface, wherein:
each rule of the plurality of rules has an associated filter comprising a test which takes into account:
a number of uncertain or unknown values required for the rule; and
a likelihood that the rule executes to true; and
execution of the plurality of rules in the specified sequence continues until a rule is executed to be true or all rules in the plurality of the rules are executed;
determine, based on the executing, the legal status of the entity; and
return the legal status of the entity.

2. The expert system of claim 1, wherein the processor is configured to return the legal status of the entity when a rule is executed to be true.

3. The expert system of claim 1, wherein a rule is not executed if the associated filter for the rule indicates that it should not be executed.

4. The expert system of claim 1, wherein the test computes the likelihood that the rule executes to true using one or more of: historical records, machine learning, or rules.

5. The expert system of claim 1, wherein the graphical user interface includes an indication of the plurality of rules defining the plurality of legal provisions, wherein the graphical user interface displays one or more of a rule identity, the legal provision defined by the rule, an outcome of an execution, or statements.

6. The expert system of claim 1, wherein the processor is further configured to return a reason for the legal status of the entity.

7. The expert system of claim 6, wherein the reason returned by the processor includes one or more statements, wherein the one or more statements include reasons why the legal provision evaluated positively or negatively and cite applicable legal provisions, cases, or other documents.

8. The expert system of claim 1, wherein the memory further stores an operational base which comprises data that changes over time, wherein the data that changes over time includes the group of attributes related to the entity and historical records.

9. The expert system of claim 8, wherein the knowledge base comprises data which does not change over time, wherein the data which does not change over time includes the plurality of rules defining the plurality of legal provisions.

10. The expert system of claim 1, wherein the graphical user interface is configured to request the user input data based on needed values for a current expression being evaluated.

11. A computer-implemented method performed by an expert system comprising:
    storing, in a memory, a knowledge base containing a plurality of rules defining a plurality of legal provisions and useable to determine a legal status of an entity in relation to the plurality of legal provisions, wherein each rule defines one legal provision via one or more expressions in a programming language;
    generating a graphical user interface that presents a group of attributes related to the entity and that is suitable for receiving user input data comprising:
        values for the group of attributes;
        certainty assignments, wherein a certainty assignment relates to a degree of certainty in an individual one of the values for the group of attributes; and
        a designation that a value for an attribute in the group of attributes is unknown;
    executing the plurality of rules defining the plurality of legal provisions in a specified sequence based on the user input data received via the graphical user interface, wherein;
        each rule of the plurality of rules has an associated filter comprising a test which takes into account:
            a number of uncertain or unknown values required for the rule; and
            a likelihood that the rule executes to true; and
        execution of the plurality of rules in the specified sequence continues until a rule is executed to be true or all rules in the plurality of the rules are executed;
    determining, based on the executing, the legal status of the entity; and
    returning the legal status of the entity.

12. The computer-implemented method of claim 11, further comprising returning the legal status of the entity when a rule is executed to be true.

13. The computer-implemented method of claim 11, wherein a rule is not executed if the associated filter for the rule indicates that it should not be executed.

14. The computer-implemented method of claim 11, wherein the test computes the likelihood that the rule executes to true using one or more of: historical records, machine learning, or rules.

15. The computer-implemented method of claim 11, wherein the graphical user interface includes an indication of the plurality of rules defining the plurality of legal provisions, wherein the graphical user interface displays one or more of a rule identity, the legal provision defined by the rule, an outcome of an execution, or statements.

16. The computer-implemented method of claim 11, further comprising returning a reason for the legal status of the entity.

17. The computer-implemented method of claim 16, wherein the reason includes one or more statements, wherein the one or more statements include reasons why the legal provision evaluated positively or negatively and cite applicable legal provisions, cases, or other documents.

18. The computer-implemented method of claim 11, further comprising storing, in the memory, an operational base which comprises data that changes over time, wherein the data that changes over time includes the group of attributes related to the entity and historical records.

19. The computer-implemented method of claim 18, wherein the knowledge base comprises data which does not change over time, wherein the data which does not change over time includes the plurality of rules defining the plurality of legal provisions.

20. The computer-implemented method of claim 11, wherein the graphical user interface is configured to request the user input data based on needed values for a current expression being evaluated.

* * * * *